United States Patent

[11] 3,544,003

| [72] | Inventor | Harold R. Bissell, Jr.<br>Hacienda Heights, California |
|---|---|---|
| [21] | Appl. No. | 827,396 |
| [22] | Filed | May 23, 1969 |
| [45] | Patented | Dec. 1, 1970 |
| [73] | Assignee | Carrier Corporation<br>Syracuse, New York<br>a corporation of Delaware |

[54] FURNACE HAVING CONTROL MODULE WITH PLUG-IN RELAY MEANS FOR CONTROL OF DIFFERING VOLTAGE ACCESSORY
2 Claims, 2 Drawing Figs.

[52] U.S. Cl. ................................................ 236/11
[51] Int. Cl. .................................................. F24f 3/14
[50] Field of Search .......................................... 236/10, 11; 126/113

[56] References Cited
UNITED STATES PATENTS

| 2,810,381 | 10/1957 | Knight .......................... | 126/113 |
| 3,443,559 | 5/1969 | Pollick .......................... | 126/113 |

*Primary Examiner*—Edward J. Michael
*Attorneys*—Harry G. Martin, Jr. and J. Raymond Curtin ABSTRACT: A furnace having a control module comprising a printed circuit board which contains a prewired control circuit for either a high voltage humidifier or a low voltage humidifier. Terminal means are provided for connecting a plug-in fan relay and a thermostat in a low voltage circuit. Additional terminal means are provided for connecting a fan motor and a high voltage humidifier relay to a line voltage circuit. In the event it is desired to use line voltage humidifier controls, the humidifier relay is omitted and the humidifier controls are connected in place of the relay. In the event that it is desired to use low voltage humidifier controls, the humidifier is plugged into its socket in the high voltage circuit and the switch contacts of the humidifier relay are used to control low voltage humidifier controls, which are connected to suitable terminals in the low voltage circuit.

Patented Dec. 1, 1970

3,544,003

INVENTOR.
HAROLD R. BISSELL, JR.
BY Frank N. Decker Jr.
ATTORNEY.

3,544,003

FURNACE HAVING CONTROL MODULE WITH PLUG-IN RELAY MEANS FOR CONTROL OF DIFFERING VOLTAGE ACCESSORY

BACKGROUND OF THE INVENTION

This invention relates to heating and cooling systems which may include a field installed humidifier accessory unit for adding moisture to the air when the system is utilized to provide heating.

Humidifier accessory units are usually supplied with either line voltage controls or low voltage controls depending on the need in a particular installation. Line voltage controls have the advantage of utilizing a minimum number of components. However, the line voltage controls require more expensive wiring in order to comply with safety requirements. Low voltage controls make it possible to utilize inexpensive wiring but necessitate a modified type of control system.

The manufacturer of a furnace does not know when he sells the furnace whether it will be used with a line voltage humidifier or a low voltage humidifier. Frequently, problems are encountered by improper installation of the humidifier unit by the installer or customer. For example, the humidifier may be installed to operate when the furnace fan is operating, but this results in undesirable operation of the humidifier during summer, especially if air conditioning is also provided by the system. The humidifier may also be wired into the system to operate only if the gas burner is heating air but this is undesirable because humidification should not be provided until the furnace has warmed up and the blower is operating. In either instance, the humidifier may appear to operate properly but actually the system is not optimally operating. Some installers add an additional power transformer to the system because they do not know how to install a humidifier with an existing control system to provide proper operation of the furnace, air conditioning and humidifier controls under all conditions.

Accordingly, it is a principal feature of this invention to provide an optimum control system for use with a furnace which is capable of utilizing either a line voltage humidifier or a low voltage humidifier by the simple addition or omission of a plug-in humidifier relay.

SUMMARY OF THE INVENTION

In accordance with a preferred embodiment of this invention, there is provided a prewired circuit board having a pair of line voltage conductors connected to the primary winding of a power transformer. A pair of low voltage conductors on the circuit board are connected to the secondary winding of the power transformer. Thermostat terminal means are provided for connecting any one of a number of types of low voltage thermostats to the low voltage conductors. Terminals are also provided in the low circuit for the heating valve, furnace fan relay, and if desired, a condensing unit. Additional terminals are provided for the controls of the low voltage humidifier. Terminals are provided in the line voltage circuit for a furnace fan, furnace fan relay, and the controls of a high voltage humidifier.

A relay socket is provided for a plug-in humidifier relay solenoid in the line voltage circuit so that in the event it is desired to use low voltage humidifier controls, it is only necessary to plug the relay into the socket to connect the humidifier controls to the low voltage circuit. A temperature responsive furnace fan switch is connected in the line voltage circuit to control the operation of the high voltage humidifier controls or the humidifier relay, if low voltage humidifier controls are used, and the furnace fan. The circuit may also employ a plug-in fan relay, if desired.

By means of the control arrangement of this invention, the installation of a humidifier accessory unit having either high or low voltage controls and their proper programing with a minimum of circuit components is made simple and reliable without requiring an understanding of the control circuit functions.

DESCRIPTION OF A PREFERRED EMBODIMENT

This invention relates to a heating and cooling system which utilizes a furnace having a casing enclosing a fuel burner, a furnace fan, and a heat exchanger having a flue gas passage and a heating air passage. These components are not illustrated because they are well known in the art. A control system is provided to complete the heating and cooling system for controlling the furnace and various furnace accessories, such as the condensing unit of an air conditioning system, an electronic air cleaner, and a humidifier for adding moisture to the air discharged from the furnace fan, under certain conditions.

Figure 1:
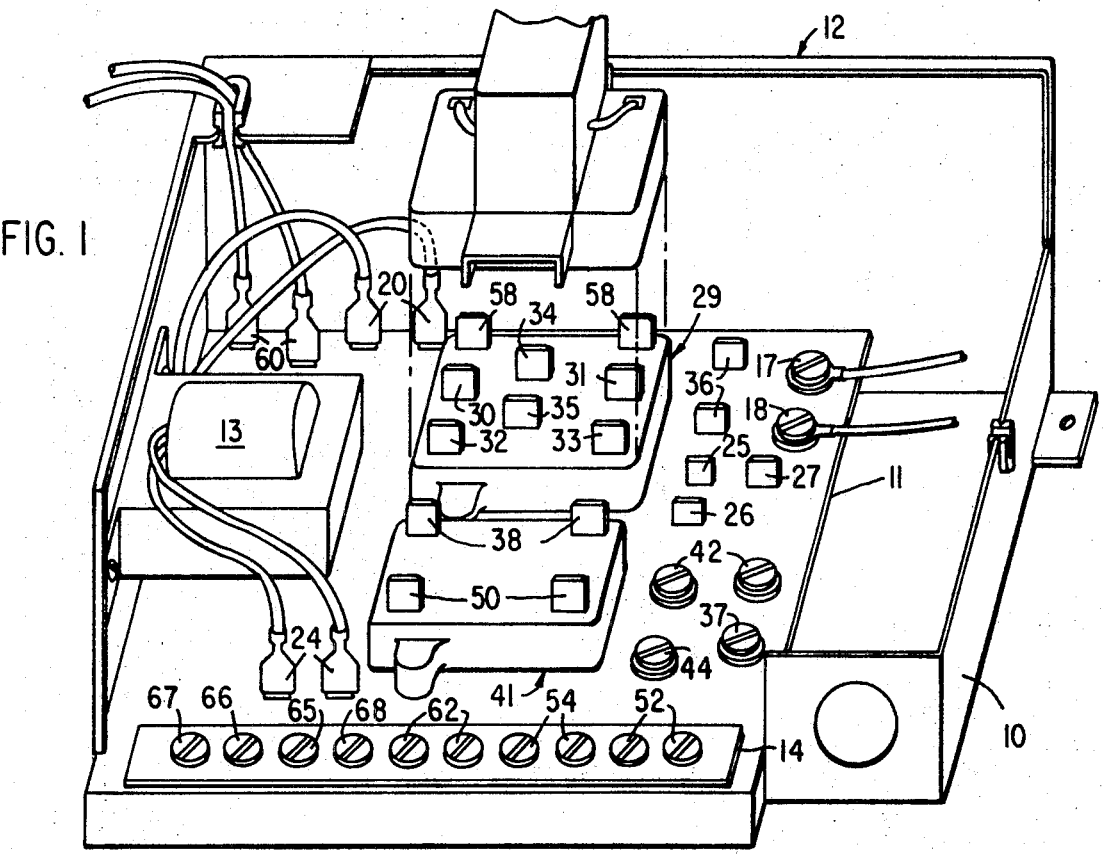
FIG. 1 is a perspective view of the control module for heating and cooling system in accordance with this invention.

FIG. 1 is illustrative of a preferred physical embodiment of a suitable prewired control module 10 for the heating and cooling system. Preferably, a circuit or terminal board 11 is mounted within a housing 12 and provided with suitable line voltage terminals, relay sockets 29, 41, a single power transformer 13, and a low voltage terminal strip 14, which are accessible from one side of the circuit board. The other side of the circuit board (not shown) is prewired by printed circuit techniques to provide the desired control function when the various terminals are connected in the intended manner.

Figure 2:
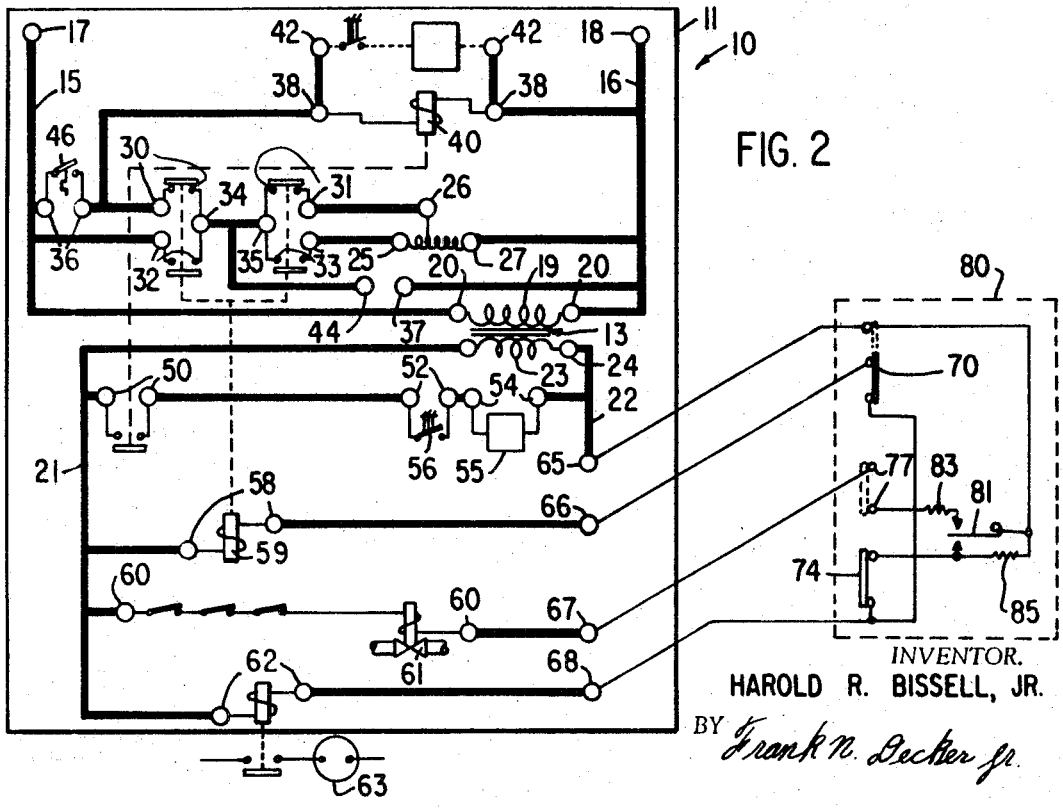
FIG. 2 is a schematic electrical diagram illustrating in bold lines the terminals and prewired connections of a circuit board suitable for use in a system constructed in accordance with this invention.

FIG. 2 illustrates the manner of prewiring of the control circuit in bold lines so that the desired program or sequence of operations is provided by the control system. The external connections made to the control module are shown in lighter lines. A pair of line voltage conductors 15 and 16 are disposed on circuit board 11 and connected to line terminals 17 and 18 respectively. Line voltage primary winding 19 of power transformer 13 is connected to terminals 20 which are electrically connected to the respective line voltage conductors. A pair of low voltage conductors 21 and 22 are disposed on circuit board 11 and low voltage secondary winding 23 of power transformer 13 is connected to terminals 24 which are electrically connected to the respective low voltage conductors to provide a source of low voltage thereto.

Three line voltage furnace fan terminals are provided on the circuit board for connecting a multispeed fan motor of a forced air furnace to the control circuit. The high speed terminal of the fan motor is connected to terminal 25; the low speed terminal of the fan motor is connected to the terminal 26 and the common terminal of the fan motor is connected to terminal 27, when the control module is installed in the heating and cooling system. In the event that it is desired to connect a single speed fan motor to the control system, terminals 25 and 26 are connected together and the fan motor is connected between terminals 25 and 27.

A fan motor relay socket 29 is mounted on terminal board 11 so that a suitable furnace fan control relay may be plugged into the circuit and replaced, if desired, for servicing. The fan motor relay has contacts for a first pair of normally closed fan motor relay switch contacts 30 and a second pair of normally closed fan motor relay switch contacts 31. The fan motor relay also has contacts for a first pair of normally open fan motor relay switch contact 32 and a second pair of normally open fan motor relay switch contacts 33. One contact of each pair of the normally open and normally closed fan motor relay switch contacts are connected to each other inside the relay and to common fan motor relay terminals 34 and 35 on the fan motor relay socket, as shown in the drawing. The other contact of each pair is connected to the correspondingly numbered terminal on fan motor relay socket 29. A pair of terminals 36 are provided on the circuit board for a normally open, temperature responsive, fan switch, which is preferably mounted on the heat exchanger and closes in response to heating of the air passing through the furnace heat exchanger. Temperature responsive fan switch terminals 36 are consequently connected in series with normally closed fan motor relay switch contacts 30 and 31 to low speed fan motor terminal 26 and common fan motor terminal 27 across line voltage conductors 15 and 16. Normally open fan switch contacts 32 and 33 are connected in series with high speed fan motor terminal 25 and common terminal 27 across the line voltage conductors. Alternatively, switch 46 could be a time delay relay.

A terminal 37 is also provided on the circuit board which is electrically connected to line voltage conductor 16. Terminals 44 and 37 are therefore connected in series with the parallel combination of normally open switch terminals 32 with series connected switch terminals 30 and 36 across line voltage conductors 15 and 16. Terminals 44 and 37 are utilized for connecting a line voltage operated electric air cleaner to the heating and cooling system.

A pair of humidifier relay solenoid terminals 38 are provided on humidifier relay socket 41 which is mounted on terminal board 11 and a pair of line voltage humidifier terminals 42 are connected in parallel with terminals 38. Humidifier relay socket 41 also provides a pair of normally open humidifier relay switch terminals 50 for a pair of normally open humidifier relay switch contacts in the relay. A pair of low voltage humidistat terminals 52 and a pair of low voltage humidifier terminals 54 for a low voltage operated humidifier 55 are provided on circuit board 11. Terminals 50, 52 and 54 are connected in series with each other across low voltage conductors 21 and 22.

One of a pair of fan relay solenoid terminals 58 provided on circuit board 11 is connected to low voltage conductor 21. One of a pair of heating control valve terminals 60 mounted on circuit board 11 is also connected to low voltage conductor 21. One of a pair of condensing unit control terminals 62 mounted on circuit board 11 is likewise connected to low voltage conductor 21. A common thermostat terminal 65, a fan control thermostat 66, a heating control thermostat terminal 67 and a cooling control thermostat terminal 68 are all mounted on circuit board 11 and connected, as shown, to the respective fan relay solenoid, heating valve control and condensing control terminals.

A thermostat 80 of the type which may be used to provide the heating and cooling functions of system described, has a manual fan switch 70, which, in one position, completes a circuit between terminals 65 and 66 to manually energize fan relay solenoid 59 and in another position, completes a circuit between terminals 66 and 68 to automatically energize the fan relay solenoid and the condensing unit of the refrigeration system in accordance with the cooling demand sensed by the thermostat. Thermostat 80 is also provided with a manual heat-cool switch 74 which in the cooling position, shown in the drawing, completes the circuit through thermostat switch element 81 between terminals 68 and 65 thereby energizing the condensing unit of the refrigeration system when the thermostatic switch calls for cooling, or through cooling anticipator 85. Switch 74 in the heating position completes the circuit between terminals 77 which connects terminal 67 through heating anticipator 83 and thermostatic switch 81 to common terminal 65 for energizing the heating control valve connected between terminals 60 when thermostat switch 81 calls for heating. The thermostat may be either of the manual or automatic changeover type if desired.

In operation, terminals 17 and 18 of the control system are connected to a source of line voltage. The furnace fan relay is plugged into socket 29 and a two-speed furnace fan is connected to terminals 25, 26 and 27. The controls for gas valve 61 are connected across terminals 60 and thermostat 80 is connected to terminals 65, 66, 67 and 68. If it is only desired to provide heating, the above connections are all that are necessary to be made to the control circuit. If only heating is required from the system, thermostat 80 may be of a simple type which does not utilize a cooling switch section and can even omit the fan switching section. Also, a single-speed motor may be connected between terminals 25 and 27 by shorting terminals 25 and 26 or by providing an internally wired fan relay switch using whatever terminals are desired to provide the particular control function required. In either event, the furnace fan is automatically energized on at least low speed whenever the temperature of the furnace heat exchanger reaches the point that temperature responsive fan switch closes.

In accordance with this invention, a humidifier is connected to the furnace in such a manner as to be operative whenever the temperature of the heat exchanger is sufficiently high to close temperature responsive furnace fan switch 46. If the humidifier is of the line voltage type employing line voltage operated controls, it is simply connected between terminals 42 in series with temperature responsive fan switch 46 across line voltage conductors 15 and 16, as shown in broken lines on the drawing. On the other hand, if it is desired to connect a humidifier having low voltage operated controls, in order to obtain the benefits of lessened safety requirements with low voltage wiring, a humidifier relay is plugged into socket 41, the humidifier controls (humidistat) are connected across terminals 52, and humidifier 55 is connected across terminals 54 as shown in the drawing.

With the humidifier relay in place, whenever temperature responsive furnace fan switch 46 is closed, solenoid 40 of the humidifier relay is energized by line voltage and contacts 50 in the low voltage circuit close. When contacts 50 are closed, humidistat 56 connected across terminals 52 controls operation of humidifier 55 by making and breaking a series circuit which includes the low voltage humidifier across low voltage conductors 21 and 22.

When it is desired to provide cooling with the system, the controls of a condensing unit 63 of an air conditioning system are connected across terminals 62. Under these conditions, thermostatic switch 81 of thermostat 80 control the operation of condensing unit 63 and energize furnace fan relay solenoid 59, whenever cooling is required. When the furnace fan relay solenoid 59 is energized, the normally closed fan relay switches 30 and 31 are opened and the normally open fan relay switches connected across terminals 32 and 33 are closed, thereby energizing the high speed winding of the furnace fan.

When the electronic air cleaner is wired between terminals 44 and 37 of the circuit, it will be seen that the air cleaner is energized whenever the furnace fan is operated on either high or low speed and irrespective of whether the system is providing heating or cooling. On the other hand, the humidifier can only operate when heating is being provided, because it is only connected in series with temperature responsive switch 46. Consequently humidification can only be provided when heating is being provided by the system and after the furnace heat exchanger is warm. It will be understood that it is normally undesirable to provide humidification when the system is operating on cooling, because it is generally desired to reduce the moisture of the air as much as possible during warm weather.

Accordingly, it will be seen that a system in accordance with this invention is readily adapted for use of humidifiers for either high or low voltage controls by simply omitting or inserting a humidifier relay in socket 41. Consequently the installer need not know what the proper program for operation of the humidifier is but can wire it into the circuit and provide for its proper operation, regardless of the type of humidifier controls employed. Furthermore, the control system provides proper humidifier operation in relation to the mode of operation of heating and cooling system without the addition of a separate control circuit or a separate power transformer as is frequently employed in such systems.

While a preferred embodiment of this invention has been described for purposes of illustration, it will be appreciated that the invention may otherwise be embodied within the scope of the following claims.

I claim

1. A heating system having a control module adapted for operation with either a line voltage controlled accessory unit or a low voltage controlled accessory unit, said heating system comprising a furnace having a casing enclosing a fuel burner a heat exchanger having a flue gas passage and a heated air passage, said furnace being adapted to have an electric motor driven fan and an accessory unit associated therewith which has a mode of operation programed to coincide with a predetermined condition of operation of said furnace, and a control module for controlling operation of said furnace fan in response to a desired condition and adapted to provide connection to the controls of said accessory unit, said control module comprising:
 a. a circuit board;
 b. a pair of line voltage conductors disposed on said circuit board and a pair of line terminals for connecting said line voltage conductors to a source of line voltage;
 c. a pair of low voltage conductors disposed on said circuit board;
 d. a power transformer having a line voltage primary winding and a low voltage secondary winding, said primary winding being connected across said line voltage conductors and said secondary winding being connected across said low voltage conductors;
 e. a furnace fan motor terminal means mounted on said circuit board for connecting said fan motor across said line voltage conductors;
 f. a fan motor relay having a fan motor relay solenoid adapted to be mounted on said circuit board across said low voltage conductors;
 g. thermostat terminal means on said circuit board for connecting a low voltage thermostat having a pair of switch contacts to said circuit board;
 h. heating control terminal means on said circuit board for connecting a heating valve control in series with the switch contacts of said thermostat across said low voltage conductors;
 i. low voltage accessory control terminal means on said circuit board for connecting the controls of a low voltage furnace accessory unit across said low voltage conductors to provide power for operation of said low voltage accessory unit controls; and
 j. an accessory relay socket mounted on said circuit board and adapted to receive a plug-in accessory control relay, said accessory relay socket having a pair of relay switch contact terminals connected in series with said low voltage accessory control terminals across said low voltage conductors, whereby a line voltage operated control for said accessory unit may be directly connected to said furnace control system across said accessory relay solenoid terminals for operation with the control system without said accessory relay, or a low voltage operated control for said accessory unit may be connected across said low voltage accessory control terminals in series with said accessory relay switch contacts and an accessory relay plugged into the accessory relay socket, for operation of a low voltage control for the accessory unit with the same control module.

2. A heating system as defined in claim 1 wherein said accessory unit comprises a humidifier adapted to be connected to said circuit board, and said system includes a line voltage furnace fan switch mounted in heat exchange relation with said heat exchanger for sensing the temperature thereof, said furnace fan switch having a pair of switch contacts which are closed upon sensing a temperature above a predetermined temperature, said furnace fan switch contacts being connected in series with said accessory relay solenoid terminals across said line voltage conductors, said furnace fan switch also being in series with said furnace fan motor terminals so that said motor and said humidifier are simultaneously energized when said heat exchanger reaches a predetermined temperature irrespective of whether the control of said accessory unit is line voltage actuated or low voltage actuated.

UNITED STATES PATENT OFFICE
CERTIFICATE OF CORRECTION

Patent No. 3,544,003                    Dated   December 1, 1970

Inventor(s)   HAROLD   R. BISSELL, JR.

It is certified that error appears in the above-identified patent and that said Letters Patent are hereby corrected as shown below:

Column 2, line 65, for "contact" read --contacts--.

Column 6, line 8, after "of" insert --accessory relay solenoid terminals connected across said line voltage conductors, and a pair of--.

Signed and sealed this 27th day of April 1971.

(SEAL)
Attest:

EDWARD M. FLETCHER, JR.           WILLIAM E. SCHUYLER, JR.
Attesting Officer                 Commissioner of Patents